United States Patent
Robinson

(10) Patent No.: US 7,486,953 B2
(45) Date of Patent: Feb. 3, 2009

(54) METHOD AND SYSTEM FOR SOFT HANDOVER

(75) Inventor: Ian Robinson, Venice, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 800 days.

(21) Appl. No.: 10/722,863

(22) Filed: Nov. 26, 2003

(65) Prior Publication Data

US 2005/0113129 A1  May 26, 2005

(51) Int. Cl.
*H04Q 7/20* (2006.01)
(52) U.S. Cl. .................. 455/442; 455/436; 455/525; 455/452.1
(58) Field of Classification Search ............... 455/436, 455/525, 438, 439, 442, 446, 450, 452.1, 455/452.2, 515, 464, 67.11, 509; 370/337, 370/331, 350, 367, 516
See application file for complete search history.

(56) References Cited

U.S. PATENT DOCUMENTS

| | | | |
|---|---|---|---|
| 5,519,441 A | | 5/1996 | Gusmano et al. |
| 5,613,203 A | * | 3/1997 | Dupuy et al. ............... 455/436 |
| 5,640,679 A | * | 6/1997 | Lundqvist et al. ........... 455/525 |
| 5,812,025 A | | 9/1998 | Shimazaki |
| 5,838,598 A | | 11/1998 | Hurrell |
| 6,101,175 A | * | 8/2000 | Schorman et al. ........... 370/331 |
| 6,111,529 A | | 8/2000 | Maulik et al. |
| 6,381,232 B1 | | 4/2002 | Strawczynski et al. |
| 6,381,458 B1 | | 4/2002 | Frodigh et al. |
| 6,393,003 B1 | * | 5/2002 | Lee ........................... 370/331 |
| 6,493,554 B1 | | 12/2002 | Kanerva et al. |
| 6,509,852 B1 | | 1/2003 | Todsen et al. |
| 6,539,227 B1 | | 3/2003 | Jetzek et al. |
| 6,563,806 B1 | * | 5/2003 | Yano et al. ................. 370/330 |
| 6,577,868 B1 | | 6/2003 | Vialen et al. |
| 6,625,137 B1 | * | 9/2003 | Kang ......................... 370/338 |
| 2001/0024430 A1 | * | 9/2001 | Sekine et al. ............... 370/331 |

(Continued)

FOREIGN PATENT DOCUMENTS

EP  0 501 808 A2  9/1992

(Continued)

OTHER PUBLICATIONS

International Search Report for corresponding PCT/US2004/039144, completed Apr. 11, 2005 by C. Isopescu.

*Primary Examiner*—John J Lee
(74) *Attorney, Agent, or Firm*—Tarolli, Sundheim, Covell & Tummino LLP

(57) ABSTRACT

Soft handover of a mobile unit is facilitated on a wireless network from base station to base station. The network can employ multi-channel receivers to receive signals from mobile units within range, including mobile units assigned to neighboring base stations. Information associated with received signals, such as an indication of their signal strength, can be relayed to a central location for assessing whether the mobile unit should be assigned to another base station, and implement reassignment of one or more mobile units based on such assessment. Soft handover reduces dropped calls when the connection from mobile to base station is unexpectedly lost. The second BTS can add a carrier to communicate with the mobile unit and provides the mobile unit with the necessary parameters, such as frequency and time slot data, to complete the handover or the connection can be established through a variety of contingency plans.

35 Claims, 12 Drawing Sheets

U.S. PATENT DOCUMENTS

| | | | |
|---|---|---|---|
| 2003/0114159 A1* | 6/2003 | Park et al. | 455/436 |
| 2003/0129982 A1* | 7/2003 | Perini | 455/442 |
| 2003/0148765 A1* | 8/2003 | Ma et al. | 455/438 |
| 2004/0184423 A1* | 9/2004 | Tiedmann et al. | 370/331 |

FOREIGN PATENT DOCUMENTS

| | | |
|---|---|---|
| EP | 0 577 322 A1 | 1/1994 |
| WO | WO 02/37888 A1 | 5/2002 |

* cited by examiner

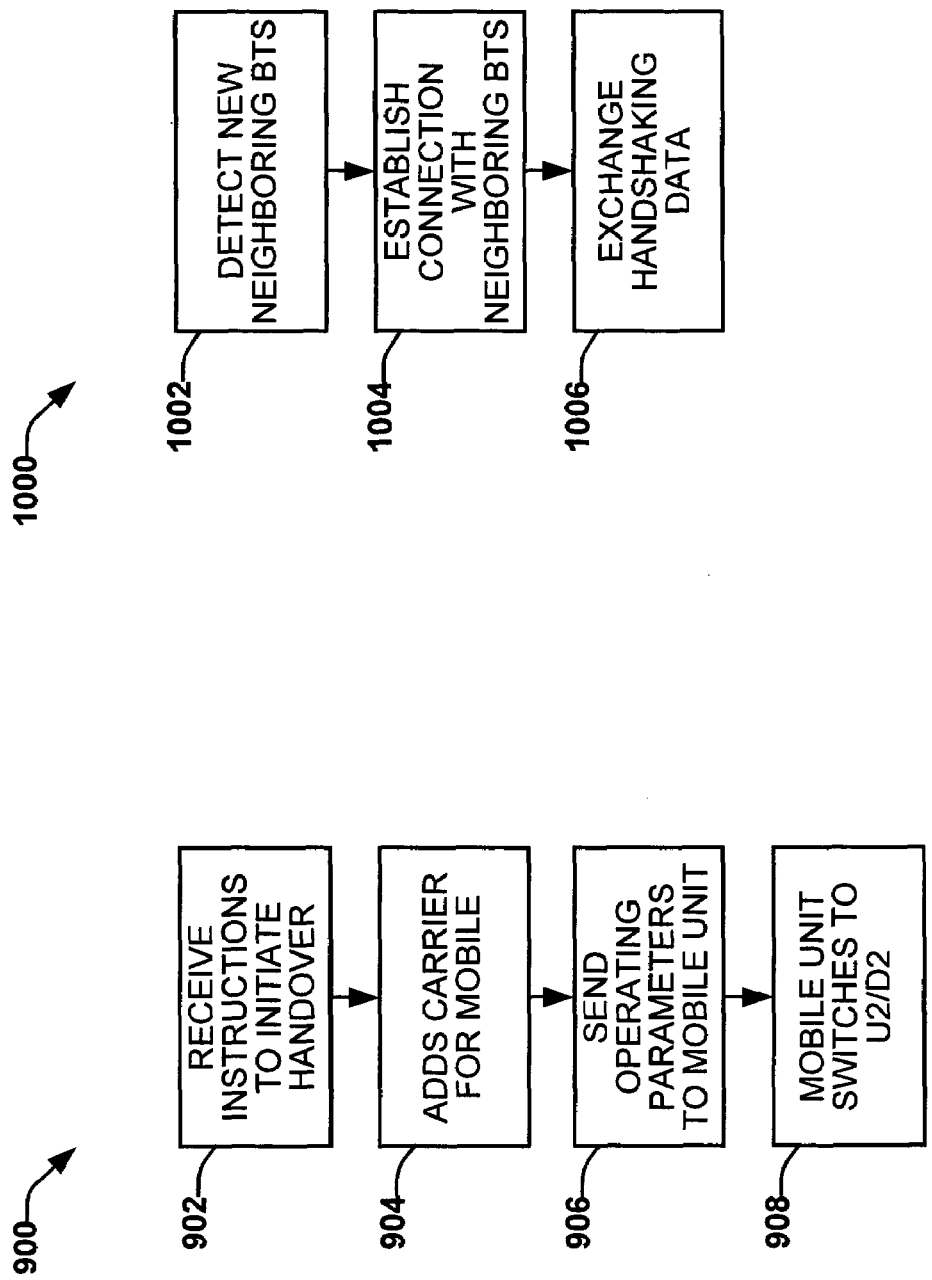

METHOD AND SYSTEM FOR SOFT HANDOVER

TECHNICAL FIELD

The present invention relates generally to wireless communications and, more specifically, to methods and systems for soft handover.

BACKGROUND OF THE INVENTION

A typical mobile network such as a standard Global System for Mobile (GSM) network comprises several base stations, or base transceiver stations (BTS), which communicate in with mobile units, each mobile unit transmitting on a single frequency or carrier and receiving on a separate single frequency or carrier. Clusters of base transceiver stations are controlled by a base station controller (BSC). The BSC assigns frequencies and/or time slots (as well as codes if appropriate) to each connection, minimizing co-channel and adjacent channel interference. The BSC and/or the local BTS monitor the strength of the signal from each mobile unit in contact with a BTS to determine which BTS should be assigned to that mobile. Mobile units can also provide feedback on received signal strength, carrier to noise ratio observed by the mobile unit. This information on the propagation environment is used to balance the communications load and assign each mobile unit to a BTS. The assignment generally includes information to enable the mobile unit to share access to the BTS in the form of a time slot, a frequency or frequencies, a code, or a combination thereof, generally depending on the communications protocol being implemented.

One aspect of mobile communication relates to handover in which the connection for a mobile unit is switched from one BTS to another BTS. Handover may take place between neighboring BTS or from one sector covered by a BTS to another sector of the same BTS. All discussions of handover can be for either case. Hard handover is one type of handover commonly used in systems where multiple users share access by time division multiple access (TDMA) or frequency division multiple access (FDMA). When hard handover occurs, the mobile unit severs all contact with the existing base station and then establishes a session with the new base station. In a GSM network, the mobile unit switches frequencies for both transmit and receive every time slot and also when handoff occurs.

In mobile assisted handoff (MAHO), the mobile unit, which only receives voice or data information during a subset of the time slots broadcast by the BTS (one in eight for a GSM voice connection), can sample signals from neighboring base stations during the unused time slots to provide additional information. These signals are power controlled for other users and can fluctuate rapidly. If the mobile is receiving data via GSM Packet Radio Service (GPRS), it may receive data during most of all of the time slots. Handoff may be initiated by the BSC, BTS, or the mobile unit depending on system design. In either case, feedback from the mobile unit is useful in deciding when to initiate handoff.

Hard handover is less desirable than soft handover because the existing connection between a BTS and a mobile unit is completely severed and a completely new connection must be initiated within a constrained amount of time, typically 200 ms in a GSM network. If the system does not perform nominally during the handover period there is a good chance the connection will be dropped. Soft handover has been implemented in wireless systems using code division multiple access (CDMA) that allows neighboring base stations to share frequencies.

Unexpected loss of signal from the mobile to its BTS or from the BTS to the mobile (which can occur separately or together) often results in a dropped call. Current systems using either soft handover, or hard handover in particular, are vulnerable to dropping calls due to unscheduled loss of signal.

Soft handover allows some level of communications to be established between a mobile unit and a new base station prior to the disconnection of the mobile unit from its existing base station. Soft handover is less susceptible to dropped calls and the latency for establishing a connection to the new base station is also reduced. Thus, a method for soft handover is desirable, particularly for GSM and other TDMA and FDMA wireless standards. Having established connectivity in at least one direction with a second BTS enables the system to be much more robust against dropping calls due to sudden loss of signal.

Mobile users may be denied a connection if they attempt to initiate a call where the primary coverage (e.g. strongest signal) is from a BTS that either can not receive a signal from the mobile (note the transmit and receive links are not symmetric) or if the BTS is using all of its assigned frequencies and time slots. Similarly, a mobile user that moves into a new area that nominally has coverage may be dropped if the BTS providing the coverage does not have available capacity to transmit and/or receive. In both these cases other base stations may be in range to communicate with the mobile and a system enabling a mobile to communicate with more than one BTS would enable superior load balancing and deployment of network resources.

SUMMARY OF INVENTION

The present invention is directed to methods and systems for implementing soft handover between a mobile unit and base stations. An aspect of the present invention provides a method for implementing soft handover at a first BTS. The method comprises monitoring a connection between a mobile unit and a second BTS, adding a carrier to communicate with the mobile unit, and sending a signal to the mobile unit via the carrier, which causes the mobile unit to switch its connection from the second BTS to the first BTS. The handover may entail a change of uplink (the signal originating from the mobile, also called the return signal) and/or downlink (the signal originating at the BTS, also called the forward signal) frequencies to establish communication between the first BTS and the mobile unit.

Determining when the mobile unit should switch BTS's, for example, may be based on a comparison of the received signal strength at the first BTS and the received signal strength at the second BTS, a comparison of the quality of the signal received by the first BTS with the quality of the signal received by the second BTS, to avoid interference signals, to more optimally balance the load of mobiles assigned to respective base stations, when the mobile unit cannot adequately communicate with the second BTS, or when the second BTS cannot communicate with the mobile. The first BTS may monitor a predetermined contingency frequency that is used by the mobile unit when the mobile unit cannot adequately communicate with the second BTS. The first BTS adds a carrier on a predetermined downlink contingency frequency based on a signal received from the mobile unit on the contingency frequency. The downlink contingency frequency may be the same frequency as the mobile unit is broadcasting on, or another frequency. The first base station may subsequently remove the added carrier.

Another aspect of the present invention relates to a method for facilitating soft handover for a mobile unit. A plan is transmitted to the mobile unit. The plan identifies one or more new carriers for the mobile unit to switch to in the event it does not adequately receive communications from its assigned BTS.

Yet another aspect of the present invention relates to performing soft handover for a system comprising a first BTS, and a second BTS. A mobile unit receives signals from the first BTS via a first downlink frequency and sends signals to the first BTS via a first uplink frequency. The method comprises determining whether no signal and/or an inadequate signal was received from a mobile unit by the first BTS. The method further comprises causing the first BTS to stop transmitting during a time slot assigned to the mobile unit based on the determination. A carrier is added by the second BTS at the first downlink frequency. The second BTS sends a signal on the carrier during the time slot assigned to the mobile unit.

Still yet another aspect of the present invention is for a method to facilitate soft handover. A contingency plan is employed to inform the mobile of one or more contingency BTS sites to communicate with in case it can not communicate with the current (or primary) BTS. The mobile unit establishes a session with one or more neighboring contingency BTS's and transmits handshaking data, such as a contingency frequency and/or time slot planning data, during one or more of its unused time slots. These contingency plans can be updated periodically for the mobile unit as well as for the BTS units.

Yet another aspect of the present invention is directed to a method for adding a new mobile unit to a BTS unit. The method comprises adding a new carrier by the BTS. If the BTS is transmitting at or near maximum power, the method further comprises reducing power for one or more carriers for the next time slot to communicate with the new mobile, and transmitting a time slot and carrier assignment to the new mobile unit. Other methods for reducing power include, but are not limited to, temporarily reducing transmit power to another mobile unit, or commanding to another mobile unit to switch to another BTS unit.

Another aspect of the present invention relates to a system to facilitate soft handover. The system can include a first BTS, a second BTS, and a controller. The first BTS receives on a first primary uplink frequency and is capable of monitoring/receiving at least one other uplink frequency. The first BTS can monitor the mobile's uplink frequencies for one or more of the surrounding BTS's, for example, the uplink frequency to the second BTS, or the first BTS can monitor all of the frequencies used in the network. In addition, the first BTS transmits on a first primary downlink frequency and is capable of adding at least one other downlink frequency as needed. The added downlink frequency can be removed when it is no longer needed. The second BTS receives on its own primary uplink frequency (a second primary uplink frequency) and like the first BTS is capable of monitoring/receiving at least one other uplink frequency. The second BTS can monitor the uplink frequencies being transmitted to the surrounding BTS's, for example, the first BTS's uplink frequency, or the second BTS can monitor all of the frequencies used in the network. In addition, the second BTS transmits its own primary downlink frequency (second primary downlink frequency) and is capable of adding at least one other downlink frequency as needed. The added downlink frequency can be removed when it is no longer needed.

Because each BTS can monitor/receive signals from mobile units that are not on its primary frequency, each BTS can detect this signal and extract information content and/or send to the controller information regarding the mobile's signal (e.g., signal strength, error rates). The controller can use this information for planning and network balancing. For example, the controller can initiate handover when one BTS that is receiving a mobile unit is becoming overloaded to another BTS that is also receiving the BTS with enough capacity to service the mobile unit. In addition, the first BTS can relay a signal to the controller which alerts the controller that an expected signal from a designated mobile has not been received. If the signal has been received at the second BTS the system can act to prevent dropping the call. The controller can command the first BTS to send a handover command to the mobile switching it to the second BTS. Alternatively, the controller can instruct the second BTS to add a carrier at the appropriate time slot and begin communicating with the mobile.

Another aspect of the present invention is to receive signals at multiple BTS sites and geolocate wanted signal sources and/or interference sources. Handover of one or more mobile units is initiated to better optimize loading and ensure minimum communications quality. Source location can be tracked and future locations predicted, facilitating the planning for handover events. The source and interference location information also supports planning of selective antenna gain and the combining of wanted signals from multiple antennas located at two or more BTS sites.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 10 is a flow diagram illustrating the steps used by a BTS to facilitate handover in accordance with an aspect of the present invention.

FIG. 11 is a flow diagram illustrating the steps used by a mobile unit to facilitate soft handover in accordance with an aspect of the present invention.

DETAILED DESCRIPTION OF INVENTION

The present invention relates generally to a methods and systems for facilitating soft handover of a mobile unit on a wireless network. The present invention can employ multi-channel receivers to receive signals from any mobile units within range, including mobile units assigned to neighboring base stations. The received signals, or at least information associated with the signals, can be relayed to a central location. The information can be utilized to assess whether a mobile should be handed over to another base station.

The present invention provides a solution for handoff between base stations in Global System for Mobile (GSM), Time Domain Multiple Access (TDMA), Frequency Domain Multiple Access (FDMA), and other wireless standards. Because the mobile unit may already be communicating with the BTS that the mobile unit is being handed off to prior to such handover, latency can be reduced. Although the present invention is described throughout this specification in terms of a mobile unit communicating in a wireless network to BTS's in a GSM environment, those skilled in the art can readily appreciate that the present invention is adaptable to other wireless environments. Thus, the specification herein should not be construed as limiting the present invention to only a GSM network with BTS's. The functionality of the BTS's described herein may be incorporated into base units of other wireless environments.

Figure 1:
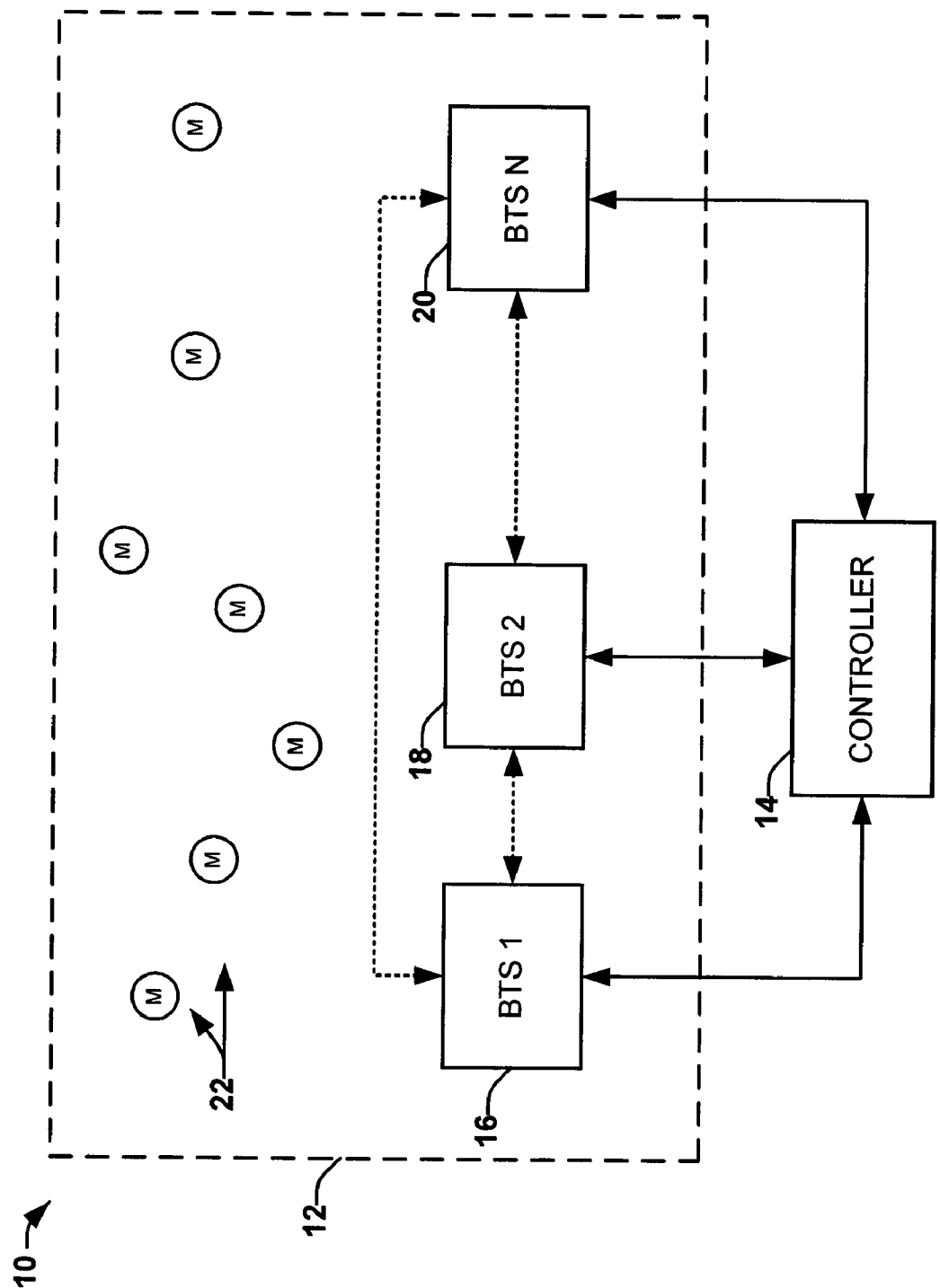
FIG. 1 is a block diagram illustrating a communications system in accordance with an aspect of the present invention.

FIG. 1 depicts an example of a communication system 10 that can be implemented for a coverage area indicated at 12. The system 10 includes a controller 14, such as a base station controller (BSC). The controller 14 controls how communications occur within its coverage area 12. The controller 14 can communicate with other controllers (not shown) over an associated network, such as a public switched telephone network (PSTN). The system 10 also includes a plurality of base transceiver stations (BTS's) 16, 18 and 20. Each of the BTS's includes an associated local coverage area that collectively defines the area 12.

A plurality of mobile units 22 operate within the coverage area 12 and, more particularly, in local coverage areas associated with the respective BTS's 16-20. That is, each of the mobile units implements communications with an associated BTS 16, 18, 20 depending on which BTS's local coverage area the mobile unit 22 is located. Each BTS 16, 18, 20 is capable of monitoring and/or receiving communication signals from mobile units located in the coverage areas associated with other BTS's. That is, in addition to communicating (e.g., via an uplink and downlink channel) with the mobile units located within its own local coverage area, each BTS can monitor communications (e.g., uplink and/or downlink channels) in one or more neighboring local coverage areas. Each of the BTS's 16-20 can provide information to the controller 14 indicative of propagation environment based on the mobile units within its coverage area as well as those mobile units that may be monitored, but located in other local coverage areas. The controller 14 can collect the information from the BTS's 16-20 and ascertain a better understanding of the propagation environment in the total coverage area 12 supported by the controller 14. Additionally, the controller 14 can employ the information received from the BTS's 16-20 to understand potentially interfering signals since it can obtain information from a plurality of BTS's over a plurality of signal frequencies.

In accordance with an aspect of the present invention, the controller 14 can utilize the information obtained from the respective BTS's 16-20 to facilitate soft handover for mobile units 22. In one implementation, the controller can derive a contingency plan for each of the mobile units 22 located in the network 12. For example, the contingency plan can establish a secondary BTS for each mobile unit 22, such that upon losing communication with its primary BTS the mobile unit can communicate with the secondary BTS over the same or a different carrier.

When a contingency plan is implemented, the controller 14 can update the contingency plan provided to the BTS's 16-20. For example, the controller 14 can modify a contingency plan for a given mobile unit as a function of the information collected from the plurality of BTS's 16-20. As mentioned above, the information received from the plurality BTS's can provide information about the propagation environment and/or interference and signal patterns. In addition or alternatively to the controller 14 providing contingency plan information to the BTS's 16-20, the controller 14 can provide contingency plan information to the mobile units, such as by relaying the contingency plan through one or more of the BTS's. In this way, the mobile units can be instructed to initiate soft handover based on a respective contingency plan. The controller 14 further can employ the information received from the BTS's 16-20 to update the contingency plans accordingly. The controller 14 can implement the updates for each BTS 16-20 and/or each mobile unit 22 at a desired update rate, such as every burst, for example.

In an alternative implementation, the system 10 can implement a reactive approach when a mobile unit is unable to receive signals from its primary BTS. The reactive approach can also be facilitated by the controller 14 controlling the soft handover based on the information the collected from the BTS's 16-20. For example, a corresponding mobile unit 22 can transmit a predetermined signal to indicate when it is unable to communicate with its primary BTS. The controller 14, in response to receiving an indication from its primary or a secondary BTS (that is monitoring the mobile) can instruct the secondary BTS to add an appropriate carrier to enable communication with the mobile so that the mobile's call is not dropped in the system 10.

Soft handover can also be implemented when a primary BTS is unable to receive signals from a mobile within its local coverage area, but where the mobile can still receive signals from its primary BTS. For example, in a reactive approach, a secondary BTS can relay signals to the first BTS, such as through the controller 14. In this way, an uplink channel can still be maintained from the primary BTS to the mobile, with the secondary BTS, which is monitoring the mobile, receiving the downlink communication and providing same to the primary BTS through the controller.

Alternatively, in a contingency based approach, the controller 14 can instruct a secondary BTS that it is to take over communication for a given mobile unit if the primary BTS is unable to receive communications from the given mobile. The contingency plan would specify the details associated how the secondary BTS is to implement the soft handover.

The controller 14 can also control the role of the secondary BTS's, such as the extent of their communications with mobile units not in their local coverage area. For example, a BTS 16 can monitor only downlink channel for mobile units 22 not in their local coverage area and provide a corresponding indication (e.g., signal strength) about the downlink channel to the controller 14. Alternatively, a secondary BTS can implement more formal communications in which a mobile can communicate bi-directionally with one or more secondary BTS's, such as during its unused time slots for the mobile. The controller 14 thus can continue to collect information from the BTS's 16-20, convene information about the mobile units' movement and the changing propagation environment. This enables the controller 14 to implement soft handover and/or appropriate contingency planning to facilitate soft handover, as described herein. According to an aspect of the present invention, the BTS's 16-20 can be implemented as multi-carrier transceivers capable of adding new carriers on demand.

Figure 2:
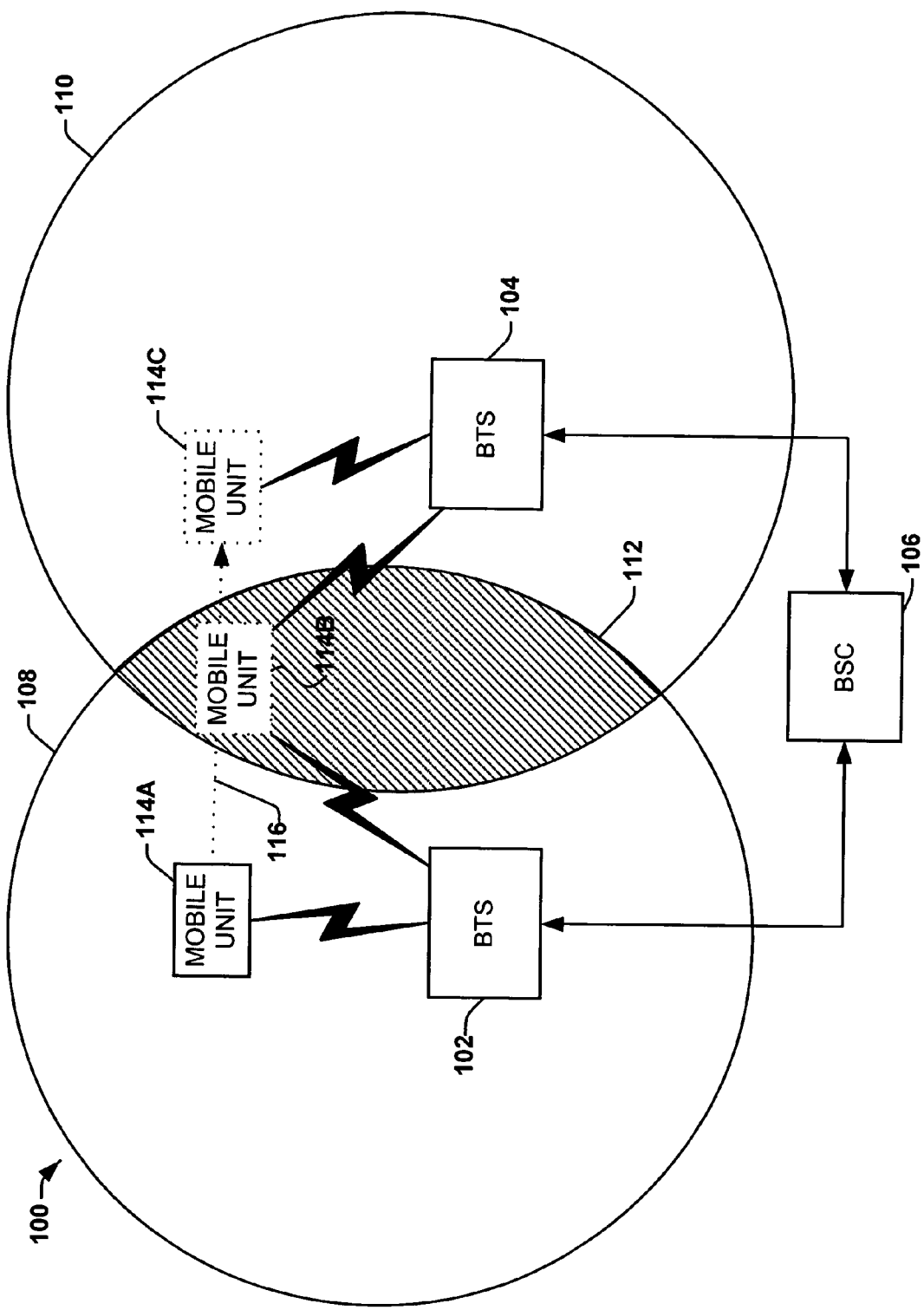
FIG. 2 is a block diagram illustrating a wireless network in accordance with an aspect of the present invention.

Referring to FIG. 2, there is illustrated a wireless operating environment 100 that can implement handover according to an aspect of the present invention. The environment 100 comprises base transceiver station (BTS) units 102 and 104, and a base station controller (BSC) 106, all of which can be generically referred to as BTS's. BTS 102 has a coverage area 108. BTS 104 has a coverage area 110. The shaded region 112 where coverage areas 108 and 110 overlap is an area where coverage can be provided by both BTS 102 and BTS 104. BTS 102 and BTS 104 are connected to BSC 106. The connection between BSC 106 and BTS 102 and BTS 104 may be either a wired connection, wireless connection, or a combination of wired and wireless connections.

A mobile unit is shown at a beginning position 114A in the coverage area 108 of BTS 102. The mobile unit subsequently travels along path 116 to an ending position, indicated as a dotted line at 114C. While at position 114A, the mobile unit is in coverage area 108 and is communicating only with BTS 102. When the mobile unit crosses into shaded region 112, as shown by position 114B, the BTS 104 can, as a secondary BTS, begin monitoring the mobile unit. The mobile unit can also detect and begin exchanging parameters for soft handover with BTS 104. This communication can be unidirectional or bidirectional between the mobile unit and the BTS's 102 and 104. While in region 112, the mobile unit can communicate with both BTS 102 and BTS 104. The handover of the mobile unit from BTS 102 to BTS 104 can occur either in region 112 while the mobile unit is in position 114B and can communicate with both BTS 102 and BTS 104, or handover can occur at position 114C, which is in coverage area 110, but outside region 112. At position 114C, the mobile unit will lose contact with BTS 102. The straight line path 116 is used to merely simplify the example, as those skilled in the art can readily appreciate the mobile unit may travel along an infinite number of paths between positions 114a and 114b, which may even include the mobile unit connecting to additional BTS's (not shown). It may be further appreciated that other objects or phenomena may intervene between the mobile and one or more of the BTS changing the propagation environment between the mobile and one or more BTS. The BSC 106 can collect information from the BTS's 102 and 104 and ascertain information about the propagation environment and signal interference associated with the mobile unit.

According to one aspect of the present invention, BTS 102 and BTS 104 may use multi-carrier receivers (or multiple receivers) and monitor at least a substantial portion (e.g., up to a fixed number or even all) of the mobile units within their range. By utilizing a multi-carrier receiver, each BTS can monitor the frequencies of the adjacent BTS, and if the BTS has the capacity, the frequencies used by every BTS in the network. The frequencies of adjacent BTS's can be provided in control data provided by the BSC 106, such as according to a frequency re-use plan associated with the environment 100.

In accordance with another aspect of the present invention, BTS 102 and BTS 104 can employ multi-carrier transmitters (or multiple transmitters) to communicate with mobile units. After a BSC determines that a mobile unit's primary connection should be transferred from one BTS to another BTS, for example, the transferee BTS can initiate a new carrier frequency and transmit voice or data communications to the transferred mobile unit. Using the example of FIG. 1, after the mobile unit enters coverage area 110, such as while it is in region 112, BTS 104 begins to receive transmissions from the mobile unit. At some point after the mobile unit enters region 112 or exits coverage area 108, BTS 104 will add a carrier to its transmitter to communicate with the mobile unit and will instruct the mobile unit what, if anything, the mobile unit needs to do to communicate with BTS 104, such as which frequency and/or time slot to use.

Because the BSC 106 can receive information about a mobile unit from multiple BTS's, the controller can manage the network proactively as well as reactively. A reactive network reacts to events after they occur (e.g. after the connection between the mobile and its primary BTS has been lost). In a proactive network, the BSC 106 can plan for contingencies. For example, BSC 106 can implement a contingency plan that is provided to a BTS and/or the mobile unit for use in the event the mobile loses a connection with its primary BTS. The plan enables the mobile to switch to another BTS as opposed to dropping the call. The controller can plan ahead when to change a mobile unit from one BTS 102 to another BTS 104 based on information received from a plurality of BTS's indicative of the signal for the mobile unit. For example, BSC 106 can geolocate the mobile unit, or can track the mobile unit's positions and determine a direction or position where the mobile unit is heading and plan accordingly. The BSC 106 can also switch a mobile unit to balance network loads, for example if two BTS 102 and 104 are receiving the mobile unit and BTS 102 is at maximum capacity, BSC 106 can send a command to switch the mobile unit to BTS 104.

When a mobile unit is being received by a plurality of BTS's, the BSC 106 can send a command to any BTS that is receiving the mobile unit to initiate a handover. To initiate soft handover, the BSC 106 may command either the mobile unit's primary BTS to send soft handover data to the mobile unit, or command another BTS to send handover data to the mobile unit, such as during one of the mobile unit's unused time slot. Similarly, when the BSC 106 determines to re-assign another BTS as the mobile unit's primary BTS, the current primary BTS can inform the mobile unit of the re-assignment or the newly assigned primary BTS can contact the mobile unit.

The BTS can also use information about the mobile unit's connection to facilitate soft handover. For example, the mobile unit may receive signals from a BTS that is not receiving the mobile unit. The mobile unit can send a signal indicating it is receiving the second BTS and the BSC 106 can have the second BTS transmit handover information to the mobile unit.

Using FIG. 1 as an example, when the mobile unit first crosses over into region 112 its primary BTS is BTS 102. However, the mobile unit may then begin to receive BTS 104 before BTS 104 receives the mobile. The mobile unit can send a signal to BTS 102 which is relayed to BSC 106 that it is receiving signals from BTS 104. BSC 106 may then command BTS 104 to send soft handover data to the mobile unit during one of the mobile unit's unused time slots. For example, a GSM network usually has eight time slots, and the mobile unit may be assigned to communicate voice data via only one of the eight time slots. Since BSC 106 is aware which time slots are in use by the mobile unit, BSC 106 can instruct BTS 104 which time slots are available for the mobile unit and BTS 104 may contact the mobile unit during any of the unused time slots.

The BSC 106 may also initiate soft handover when a second BTS (e.g., not the mobile unit's primary BTS) can receive the mobile unit, but the mobile unit is not receiving the second BTS. For example, while the mobile unit is assigned to BTS 102, when the mobile unit first enters coverage area 112 BTS 104 may be able to receive the mobile before the mobile unit can receive BTS 104. BTS 104 can inform BSC 106 that is receiving the mobile unit, and BSC 106 can then send commands to BTS 102 to send soft handover data to the mobile unit to facilitate handover to BTS 104.

Another aspect of the present invention is that the BSC 106 can control the assignment of a mobile unit to a BTS. For example by receiving data from each BTS indicative of the mobile unit's signal, the controller can determine characteristics associated with the propagation environment and source of signal interference for each mobile unit. Accordingly, BSC 106 can compensate for changes in interference or environmental conditions for each mobile unit, including implementing soft handover. When the controller observes an event which may disrupt communications with a mobile (e.g., a new source of interference or a change in the type or strength of interference), the controller may act proactively to switch the mobile unit to another BTS to prevent a call from being dropped.

When a mobile unit is in contact with multiple BTS's, the controller can command any of the BTS's to send contingency plans to the mobile unit. For example, when the mobile unit is in overlap region 112 and its primary BTS is BTS 102, the controller can instruct BTS 102 to send a contingency plan to the mobile unit. Alternatively, the controller can instruct BTS 104 (or another BTS that can contact the mobile unit which is not its primary BTS) when the mobile unit has an unused time slot, and then BTS 104 can send contingency data to the mobile unit on the unused time slot. BTS 104 can contact the mobile unit either on its primary frequency or its contingent frequency by adding a carrier for the appropriate frequency.

Figure 3:
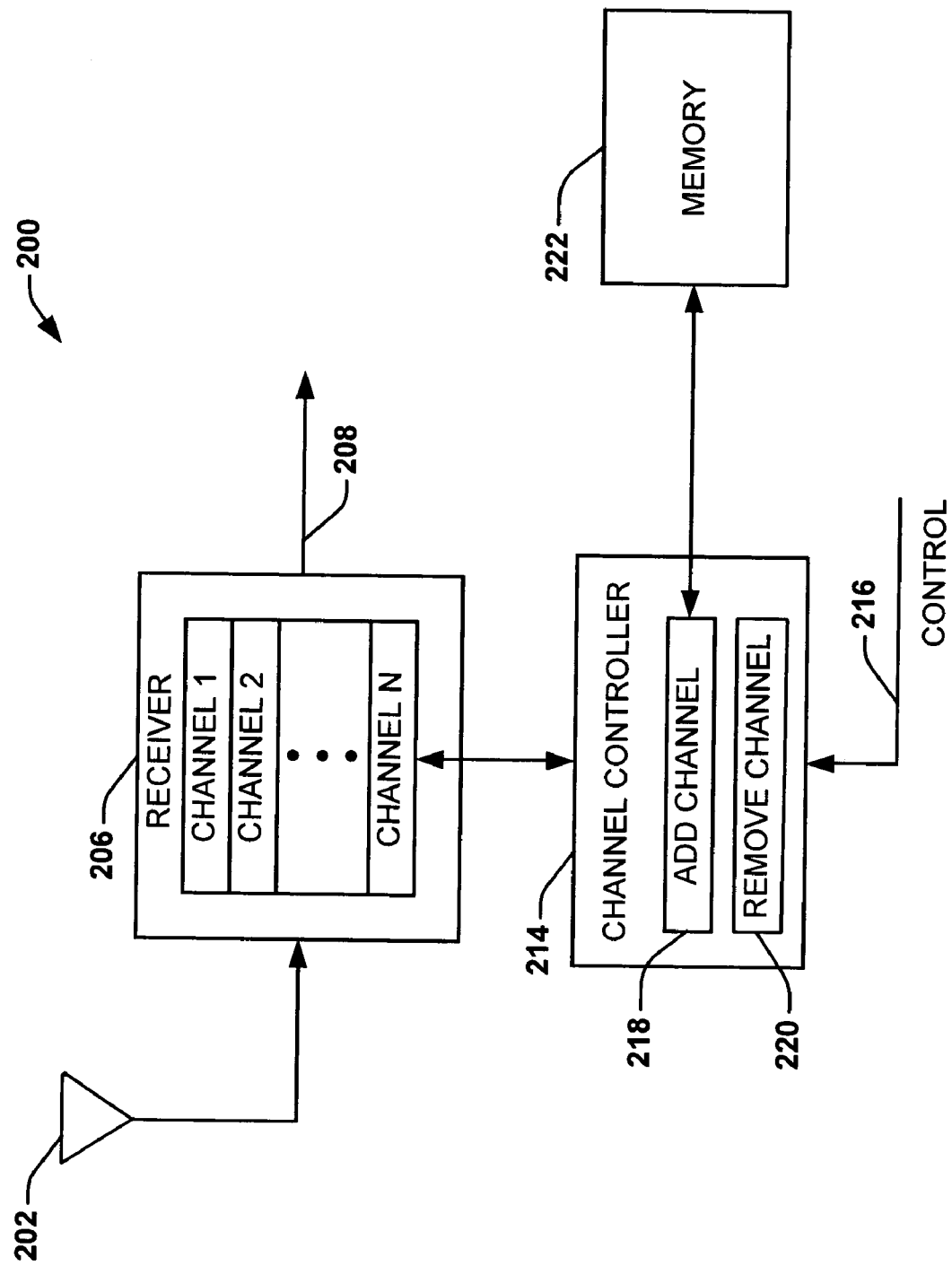
FIG. 3 is a schematic block diagram illustrating a multi-carrier receiver system in accordance with an aspect of the present invention.

FIG. 3 schematically depicts an example of a multi-carrier receiver system 200 that can be implemented, such as at a BTS, in accordance with an aspect of the present invention. An antenna 202 receives signals, such as from one or more mobile units and/or from a BSC, and sends them to receiver 206. The receiver 206 has multiple channels, indicated at Channel 1, Channel 2 . . . Channel N, where N is a positive integer greater than 1. The signals 208 received on each channel also can be sent to a BSC or other such entity (not shown).

For example, receiver 206 can receive each channel used by mobile units within the network. Alternatively, receiver 206 is able to receive at least a substantial portion of channels used by mobiles connected to adjacent BTS's, such as according to a predefined capacity for the number of useable channels. In accordance with an aspect of the present invention, a channel controller 214 can be used to add and remove channels as needed. The channel controller 214 receives a signal 216 from the BSC (not shown) instructing the channel controller 214 to add or remove a channel. An add channel module 218 is used to add a channel to receiver 206. The add channel module 218 may receive data from signal 216 to indicate the parameters of the channel to add. The add channel module 218 may also use memory 222 to determine the appropriate channel to add and any other necessary parameters. After the channel controller 214 determines the receiver 206 no longer needs a certain channel or after the add carrier module 306 receives a signal 216 from the BSC to remove the channel, a remove channel module 220 can provide a command to the receiver 206 to remove the identified channel.

Figure 4:
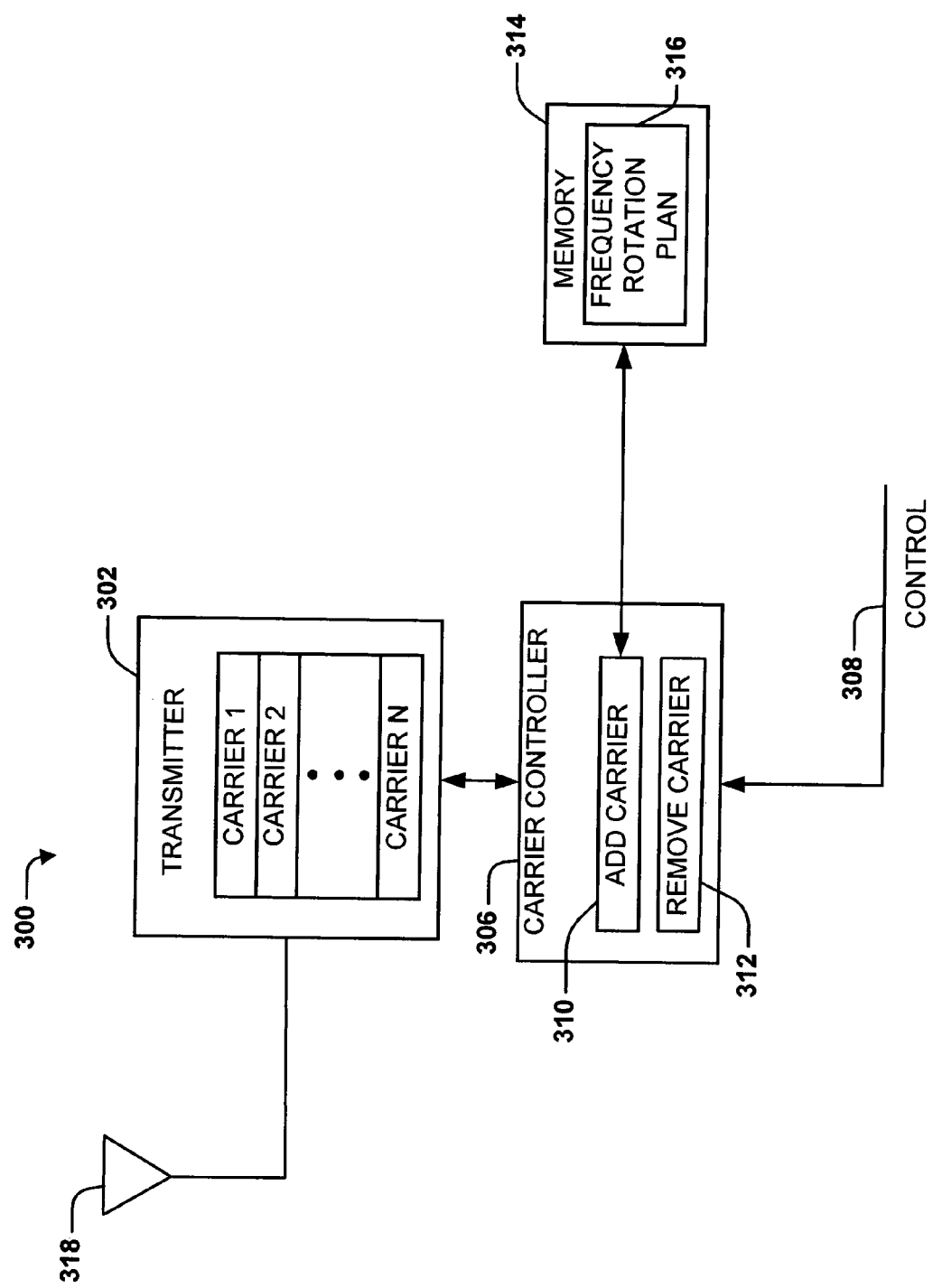
FIG. 4 is a schematic block diagram illustrating a multi-carrier transmitter system in accordance with an aspect of the present invention.

Referring now to FIG. 4, there is a schematic depiction of a multi-carrier transmitter system 300 that can be implemented in accordance with an aspect of the present invention. Transmitter 302 is capable of transmitting over one or more channels, indicated at Channel 1, Channel 2 . . . Channel N, where N is a positive integer. Carrier controller 306 instructs transmitter 302 to add or remove channels. Carrier controller 306 receives a signal 308, such as from a BSC or other entity (not shown), that instructs the controller to add or remove a channel at the transmitter 302.

For example, channels can be added when a mobile unit (not shown) is receiving a carrier not already in use by transmitter 302. For example, a mobile unit switching to a new BTS (e.g., implementing the transmitter system 300) will still be receiving the carrier assigned by its old BTS. The BSC provides control signal 308 to the new BTS to add a new carrier to enable communication with the mobile unit. An add carrier module 310 implements procedures to enable the transmitter 302 to add a carrier for the new mobile unit. After the mobile unit has made the switch or handover to the new BTS, the new carrier may be no longer needed to communicate with the mobile unit. In this situation, a remove carrier module 312 can be employed to remove the carrier. Carrier controller 306 may call the remove carrier module 312 after it determines the mobile unit has changed its carrier, or in response to a signal 308 from the BSC. The transmitter 302 outputs the carriers to antenna 318 for transmission.

The parameters for a carrier to be added or removed may be included in the signal 308 received from the BSC, or carrier controller 306 may have the parameters stored in memory 314. In accordance with another aspect of the invention, a frequency rotation plan 316 comprising a rotation schedule for contingent frequencies may also be stored in memory 314. A contingent frequency is a predetermined frequency that a mobile unit can switch to for communication with another BTS if it is unable to communicate with its primary BTS. The frequency rotation plan can be updated periodically, such as based on the control signal 308. If the mobile unit has lost contact with its current BTS, the mobile unit attempts to communicate with an alternate BTS on the contingent frequency. The alternate BTS provides the mobile unit with time slot and carrier data so that the mobile unit may establish a primary connection with the alternate BTS.

There are several methods for implementing the multi-carrier transmitter 312. One possible method is to modulate and convert each modulated carrier to RF by its exciter (not shown), the portion of the transmitter 302 that provides the modulated signal at RF for high power amplification. These signals are then combined and amplified by a multi-carrier power amplifier (MCPA, not shown). Another method comprises amplifying each carrier by a single-carrier power amplifier (SCPA) and the signals are then combined after amplification so one or a small number of antennas may transmit them.

Figure 5:
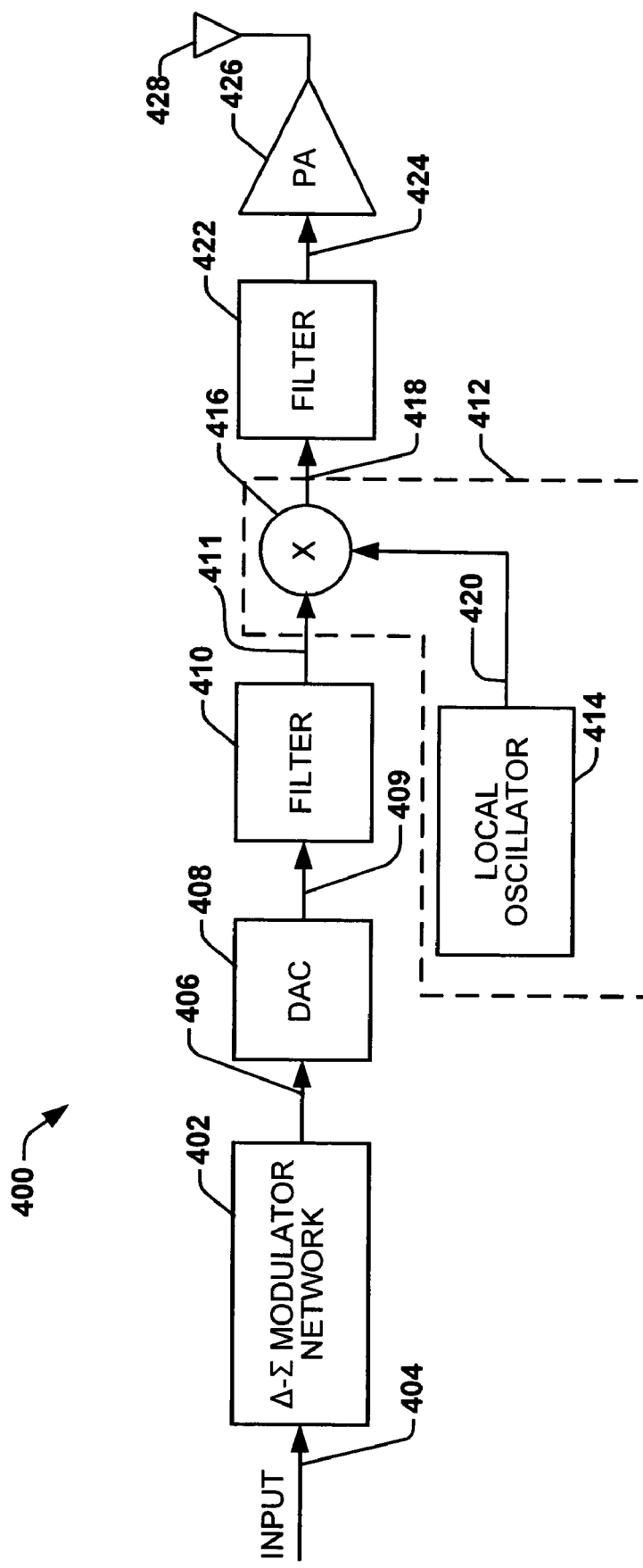
FIG. 5 is a schematic block diagram of a transmitter in accordance with another aspect of the present invention.

Referring to FIG. 5 there is an example of a transmit module 400 that can be implemented utilizing a delta-sigma modulator network 402 in accordance with an aspect of the present invention. The delta-sigma modulator network 402 receives a digital signal of multiple carriers which are, output directly at the desired RF transmission frequency. The DAC 406 shown is a one-bit DAC but the quantizer size is variable. Using a single-bit DAC maximizes linearity of the combined signal.

Delta-sigma modulation is a technique used to generate a coarse estimate of a signal using a small number of quantization levels and a high sampling rate. Briefly stated, a digital input signal 404 (e.g., from a digital signal processor not shown) is provided to an input of the transmit module 400. The delta sigma modulator network provides a quantized output signal 406. The network 400 provides the quantized output signal 406 to a corresponding DAC 408 that converts the signal to an analog signal 409 at a desired frequency, such as at a desired RF or intermediate frequency (IF). A filter 410 removes out-of-band emissions and quantization noise, such as associated with the conversion and/or the delta-sigma modulation, to provide a filter signal 411 at the desired frequency. The output frequency of the signal provided by the DAC 408 can be any desired frequency, such as in the MHz range (e.g., VHF or UHF), or GHz range (e.g., microwave/millimeter wave).

Optionally, IF signal 411 is provided to an upmixing system 412, such as where the DAC 408 is not configured to convert the signal 406 directly to a desired frequency. The upmixing system 412 can include one or more stages of upconversion and mixing, as needed to upmix the signal to a desired carrier frequency. Because a delta-sigma modulator network 412 implemented in accordance with an aspect of the present invention can provide quantized data at a high data rate, most desired frequencies (e.g., in the upper MHz or GHz range) can be achieved through a single stage of upmixing. The upmixing system 412, in this example, includes a local oscillator 414 and mixer 416 that produce a signal 418 having a desired transmission frequency. In particular, the local oscillator 414 is utilized to provide a desired carrier frequency 420 at a desired transmission frequency. The mixer 416 produces the RF signal 418 by combining the IF signal 411 with the carrier signal 420 provided by the local oscillator 414. However, filter 410 can provide output (signal 411) directly at the desired transmission frequency.

Filter 422, in turn, optimizes the bandwidth and mitigates unwanted out-of-band emissions and quantization error, such as may result from the conversion processes associated with delta-sigma modulation as well as the upmixing. The filter 422 provides the filtered analog output signal 424 to an associated power amplifier 426. The power amplifier 426, in turn, provides an amplified signal to an associated antenna 428 for wireless transmission. Those skilled in the art will understand and appreciate various other types of filtering and up-conversion that can be utilized to provide a desired RF signal utilizing the parallel delta-sigma modulator and DAC arranged in accordance with an aspect of the present invention.

The Delta-sigma network 402 can convert a large number of modulated carriers simultaneously. This is particularly useful because carriers may be added or deleted without requiring the deployment of excess or additional transmitter hardware. The add carrier function should provide each carrier with an amplitude that ensures that carrier amplitudes do not add so that the Delta-sigma network, the DAC, or any subsequent amplifiers saturate. Thus, the transmit module provides a low-cost efficient approach that can be employed in a multi-carrier transmitter, such as implemented at one or more BTS's or mobile units, as described herein.

Figure 6:
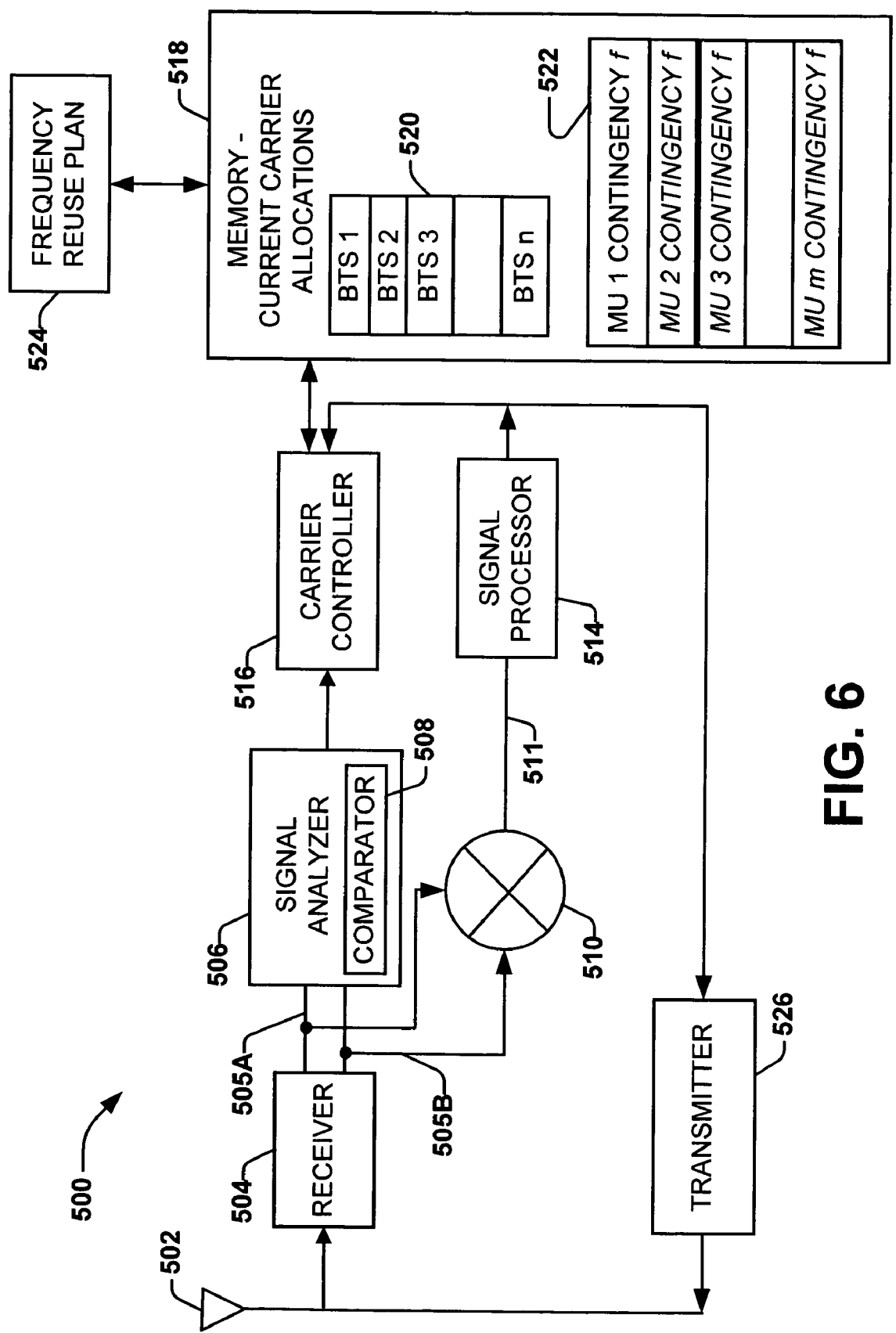
FIG. 6 is a schematic block diagram depicting a base station controller in accordance with an aspect of the present invention.

FIG. 6 is an example of a base station controller 500 (BSC) in accordance with an aspect of the present invention. In this example, an antenna 502 is shared by both a receiver 504 and a transmitter 526; however, it is also contemplated that the receiver 504 and transmitter 526 may each have one or more separate antennas.

Signals (e.g., provided by BTS's in the wireless network) are received by antenna 502 and provided to receiver 504. Receiver 504 then decodes the signals for each BTS and provides decoded signals to a signal analyzer. As shown in the example of FIG. 6, the output of the receiver 504 has two signals 505a and 505b, which correspond to the same signal but have been received at different BTS's. However, it is possible that additional signals from additional BTS may be output from receiver 504 (e.g., the receiver 504 can provide any number of output signals). The output signals 505a and 505b are also provided to a summer 510.

In accordance with one aspect of the present invention, the signal analyzer 506 comprises a comparator 508. The comparator 508 compares the signals, 505a and 505b to determine which BTS should be the primary BTS for the mobile unit in the coverage area supported by BSC 500. The comparison may be made on the basis of signal strength, for example, according to which BTS receives the stronger signal. Additionally, suitable algorithms employing thresholds or other metrics may be employed to mitigate excessively moving back and forth between BTS by the mobile unit. Other criteria, such as error correction, may be used in the comparison. For example, a greater amount of error correction coding or bit errors to be corrected can provide an indicator of strength for a given connection.

A carrier controller 516 manages the carriers used within the network. The carrier controller 516 uses memory 518 to store BTS carrier allocations 520. The BTS carrier allocations 520, for example, comprise a list of carriers being used by each BTS in the network supported by the BSC 500. For systems which use contingent frequencies, contingent frequency allocations 522 can also stored in memory 518. The contingent frequency allocations 522 are a list of frequencies that mobile units 1-m can switch to after losing contact with their primary BTS. The contingent frequency allocations 522 further can be updated based on signals received from BTS's in the network, from which the controller can ascertain information about the propagation environment and source of signal interference. If the network utilizes a frequency reuse plan 524 or frequency rotation plan for mobile unit contingent frequencies, this plan 524 may also be stored in memory 518.

After the signal analyzer 506 determines that circumstances exist in which a mobile unit should switch to another BTS, the signal analyzer notifies the carrier controller 516 accordingly. The carrier controller 516 accesses memory 518 to determine what carrier the new BTS should employ to contact the mobile unit, such as based on the BTS carrier allocations 520. The carrier, for example, may be either the mobile unit's primary BTS frequency or a contingent frequency for the mobile unit. The carrier controller 516 can select the carrier as a function of the propagation environment and signal interference for each mobile. The carrier controller 516 then provides the data to transmitter 526, which then sends the signal to antenna 502 for transmission to the appropriate BTS.

Additionally, the summer 510 can be utilized to combine the input signals, 505a and 505b, and produce a combined output signal 511. Signal 511 can be produced by synchronizing and interleaving signals 505a and 505b, or if there are no errors by selecting the strongest signal. The summer 510 enables improved reception by combining signals received by neighboring BTS or even adjacent sectors within a BTS. Signal processor 514 receives the combined signal and determines if any action needs taken and processes the signal accordingly. For example, if the signal is a transmission to another mobile unit on the network, it is forwarded to the appropriate BTS for the other mobile unit. In this example, signal processor 514 forwards the signal, along with any pertinent instructions, to the transmitter 526 which sends the signal to antenna 502 for transmission of the improved signal.

Figure 7:
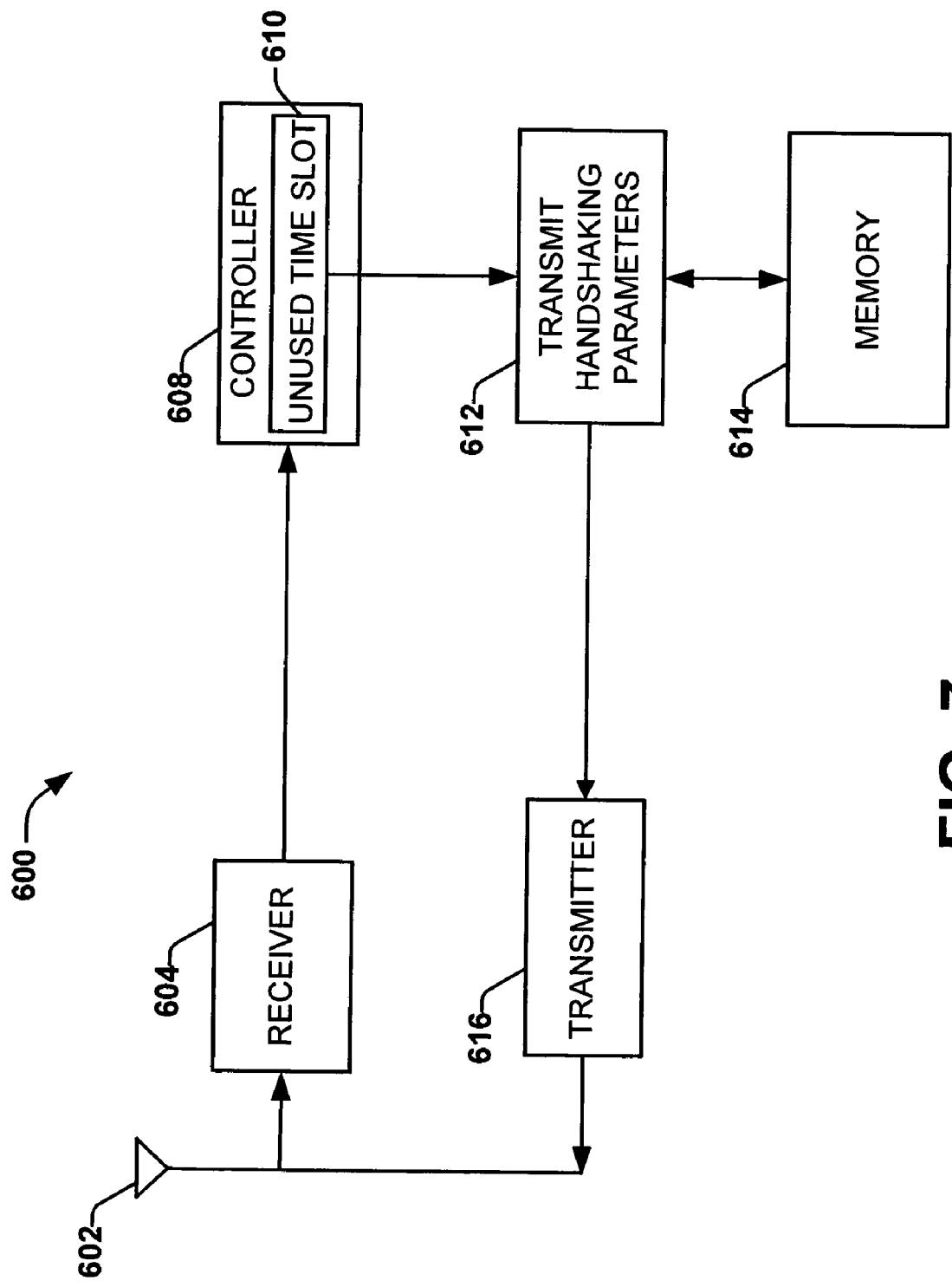
FIG. 7 is a schematic block diagram depicting part of a mobile unit in accordance with an aspect of the present invention.

FIG. 7 is a block diagram depicting a mobile unit 600 in accordance with an aspect of the present invention. Antenna 602 is connected to receiver 604. A controller 608 is connected to receiver 604. When an unused time slot is detected, the unused time slot module 610 causes the transmit handshaking parameters module 612 to send the handshaking parameters to transmitter 616, which forwards them to antenna 602 for transmission. Mobile unit 600 exploits unused time slots to establish two-way communication between the mobile unit and one or more contingency BTS (not shown). Furthermore, the handshaking data exchanged between the mobile unit 600 and a neighboring BTS could include a contingency frequency plan for the mobile unit. The contingency frequency plan contains a frequency or a list of frequencies that the mobile unit would switch to in case the mobile loses contact with its assigned BTS. The contingency frequency plan can be updated at desired intervals, such as every burst. A neighboring BTS in range of the mobile unit thus can utilize the frequency plan in conjunction with the handshaking parameters to determine what frequency to use to contact the mobile unit and establish a session with the mobile unit.

As shown, receiver 604 and transmitter 616 share antenna 602, however it is also contemplated that the receiver 604 and transmitter 616 may also each utilize one or more separate antennas.

In view of the examples shown and described above, methodologies for handover in accordance with the present invention will be better appreciated with reference to the flow diagrams of FIGS. 8-13. While, for purposes of simplicity of explanation, a methodology is shown and described as executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention. Additionally, such methodology can be implemented in hardware (e.g., one or more integrated circuits), software (e.g., running on a DSP or ASIC) or a combination of hardware and software.

Figure 8:
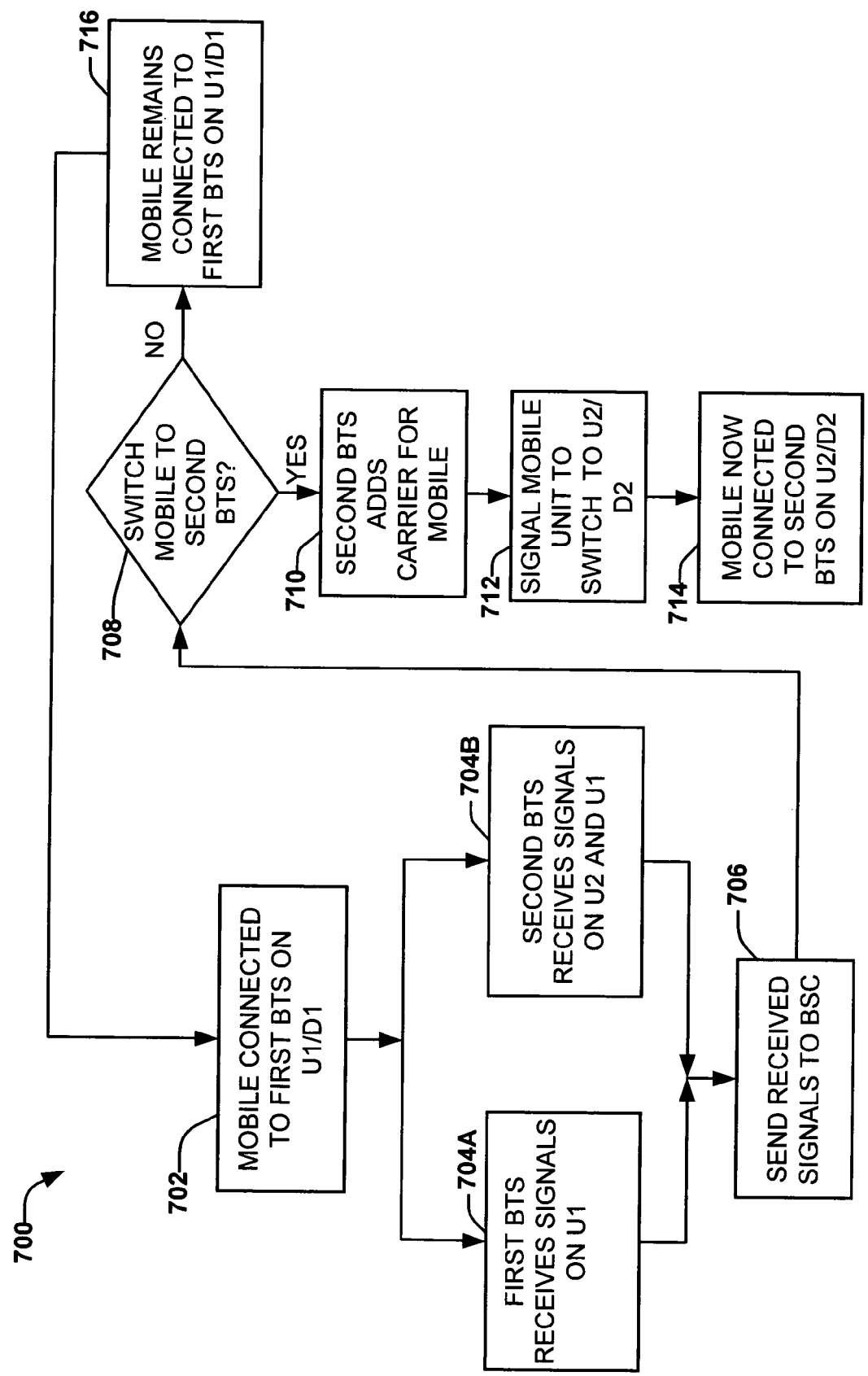
FIG. 8 is a flow diagram illustrating a handover methodology in accordance with an aspect of the present invention.

Referring to FIG. 8 there is shown a method 700 in accordance with one aspect of the present invention. The method 700 is depicted for two BTS's for sake of simplicity, although there may be and typically are more than two BTS's. Beginning at 702, a mobile unit is connected to a first BTS, as its primary BTS, on uplink frequency U1 and downlink frequency D1. At 704A, the first BTS receives a signal from the mobile unit on U1. While at 704B, a second BTS on uplink frequency U2, utilizing a multi-carrier receiver also receives the signal from the mobile unit on U1. As depicted, 704A and 704B can occur concurrently in parallel according to transmission from the mobile unit on U1.

At 706, the first BTS and the second BTS send signals to the BSC based on the signals each BTS received from the mobile unit. At 708, the BSC determines whether the mobile unit should switch to another BTS, such as the second BTS. For example, if the BSC decides that the mobile unit should be switched to the second BTS, it can notify the second BTS accordingly. The methodology proceeds to 710. At 710, the second BTS adds a carrier for the mobile unit. Adding a carrier corresponds to beginning to transmit on a frequency not already in use by that BTS that is or will be assigned to the mobile. The second BTS then begins transmitting on D1, while receiving on U1 and U2. At 712, the first BTS then sends a message to the mobile unit to switch to operating frequencies of the second BTS, which, for example, are uplink frequency U2 and downlink frequency D2.

If contact is lost between the mobile and the first BTS, the second BTS can ascertain this information from a signal broadcast on U1 or from the BSC. In this case, the second BTS can employ D1 (e.g., by adding a carrier) to provide instructions to the mobile for communications instructions, such as carrier and time slot data as well. At 714, the mobile unit is now connected to the second BTS on U2 and D2 as its primary BTS. A similar method can be implemented to ascertain whether the mobile unit should be switched to a different BTS. If at 708, the BCS does not switch the mobile unit from the first BTS, the mobile unit stays connected to the first BTS as shown at 716. From 716, the methodology can return to 702 to repeat the foregoing actions. Alternately, the mobile can be instructed that should it lose contact with the first BTS it should switch to a specific frequency and/or time slot.

Figure 9:
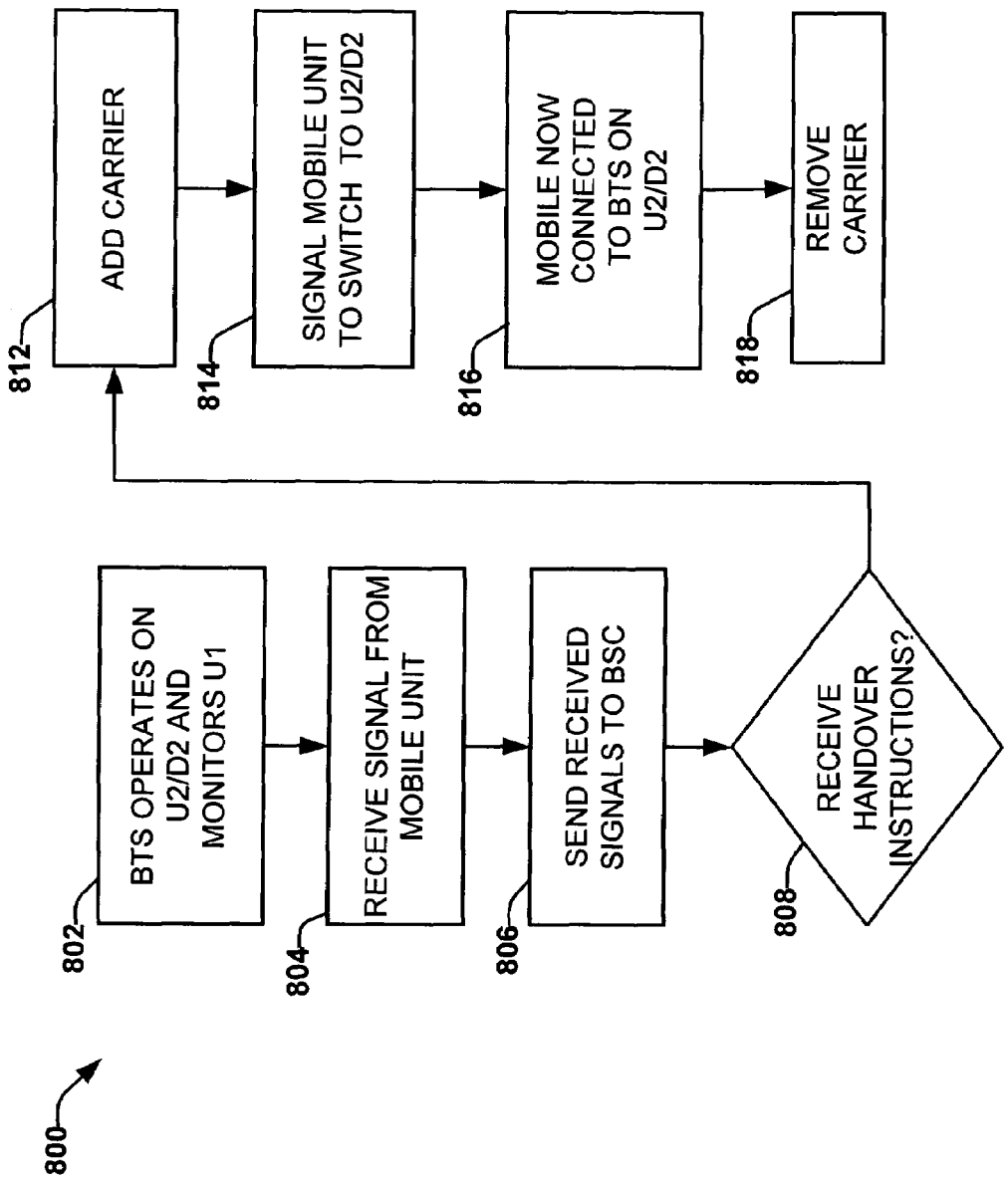
FIG. 9 is a flow diagram illustrating the handover methodology for a BTS in accordance with an aspect of the present invention.

Referring now to FIG. 9, there is shown a method 800 such as can be implemented by a BTS in accordance with an aspect of the present invention. In this example, it is assumed that a mobile unit is initially connected to another BTS as its primary BTS on uplink frequency U1 and downlink frequency D1. The BTS utilizes a multi-carrier receiver (e.g., as shown in FIG. 2) enabling it to monitor plural mobile units within its coverage area, including mobiles units connected to other BTS as their primary BTS. The BTS can send signals to the BSC (e.g. as shown in FIG.1). By receiving signals, or signal strength data, from multiple BTS, the BSC can ascertain the effects of the propagation environment and/or signal interference for the mobile unit. The BSC then employs such information to determine an appropriate BTS for the mobile unit.

As shown at 802, the BTS initially is operating on uplink frequency U2 and downlink frequency D2, and the BTS also monitors uplink frequency U1. At 804, the BTS also receives a signal from the mobile unit when the mobile unit transmits a signal to its primary BTS via U1. As the BTS is monitoring U1, at 806, it sends the information to the BSC based on the signal it received from the mobile unit on U1. Such information, for example, can include an indication of signal strength or, alternatively, the signal itself can comprise the information that is sent to the BSC.

At 808, the BTS receives handover instructions from the BSC. The handover instructions can include an identification of the mobile unit as well as carrier information, time slot information and the like. At 812, the BTS adds a carrier to communicate with the mobile unit. For example, if the mobile is still in contact with its original BTS then it can receive handover instructions from either the original BTS or the second BTS. However, if the mobile unit has lost contact with its original BTS then the second BTS needs to make contact. The carrier may be on the current frequency the mobile unit is using to communicate with the network. Alternatively, if the mobile unit has lost contact with its primary BTS, the mobile unit may switch to a contingency frequency, which would be the frequency at which the new carrier would be added. The contingency frequency information can be identified by the BSC, such as according to predetermined contingency frequency data. The contingency frequency data can be updated periodically.

At 814, the BTS instructs the mobile unit to switch to the frequencies of the BTS, namely, in this example to uplink frequency to U2 and downlink frequency D2. At 814, the BTS may also send other parameters, such as time slot assignment and/or an updated frequency plan as well to facilitate handover of the mobile unit. At 816, the mobile switches to U2 and D2 and is connected to the BTS. At 818, the BTS can remove the carrier added at 812.

Referring to FIG. 10, there is illustrated a flow diagram showing a handover method 900 for a BTS in accordance with an aspect of the present invention. In this example, the mobile unit is initially assigned to another BTS as its primary BTS, and the BTS performing the method 900 is an alternate (or contingency) BTS. The BSC may decide to switch the mobile unit from its current primary BTS to another BTS, for example, because the other BTS is receiving a better signal and/or because the mobile unit can no longer effectively communicate with its current primary BTS.

At 902, an alternate BTS receives instructions to initiate handover. For example, the BSC may assign the mobile unit to the alternate BTS and notify the alternate BTS of an imminent handover event. The BSC can determine handover should occur, for example, based on geolocating the mobile unit as well as based on the propagation environment and signal interference patterns associated with the mobile unit. At 904, the alternate BTS adds a carrier for the mobile unit. The carrier may either be at the current frequency the mobile unit is using to connect to its primary BTS or at a pre-arranged new frequency. In cases where the mobile unit can no longer communicate with its assigned primary BTS, the alternate BTS may set the carrier to a predetermined contingent frequency. The predetermined frequency may be provided by the BSC, or if the mobile unit and the alternate BTS have exchanged handshaking data for soft handover, the alternate BTS may already know the predetermined frequency. At 906, the alternate BTS sends operating parameters to the mobile unit, such as including the uplink (U2) and downlink (D2) frequencies, to enable the mobile unit to connect to the BTS. Time slot information may also be included. At 908, the mobile unit then switches to U2/D2, such that the mobile unit is now connected to the alternate BTS as its new primary BTS.

FIG. 11 is a flow diagram 1000 illustrating the operation of a mobile unit to facilitate performing soft handover in accordance with an aspect of the present invention. At 1002, the mobile unit detects a new neighboring BTS by performing periodic searches of the different BTS carrier frequencies. At 1004, the mobile unit establishes a connection with the neighboring BTS, such by utilizing an unused time slot for the mobile unit. At 1006, the mobile unit exchanges handshaking data with the neighboring BTS. The handshaking data may include basic information shared during handover and/or a contingency frequency plan, such as in case the mobile loses contact with its assigned primary BTS. After sending the handshaking parameters, the mobile unit and new neighboring BTS have sufficient data to perform a soft handover, such as described herein.

Figure 12:
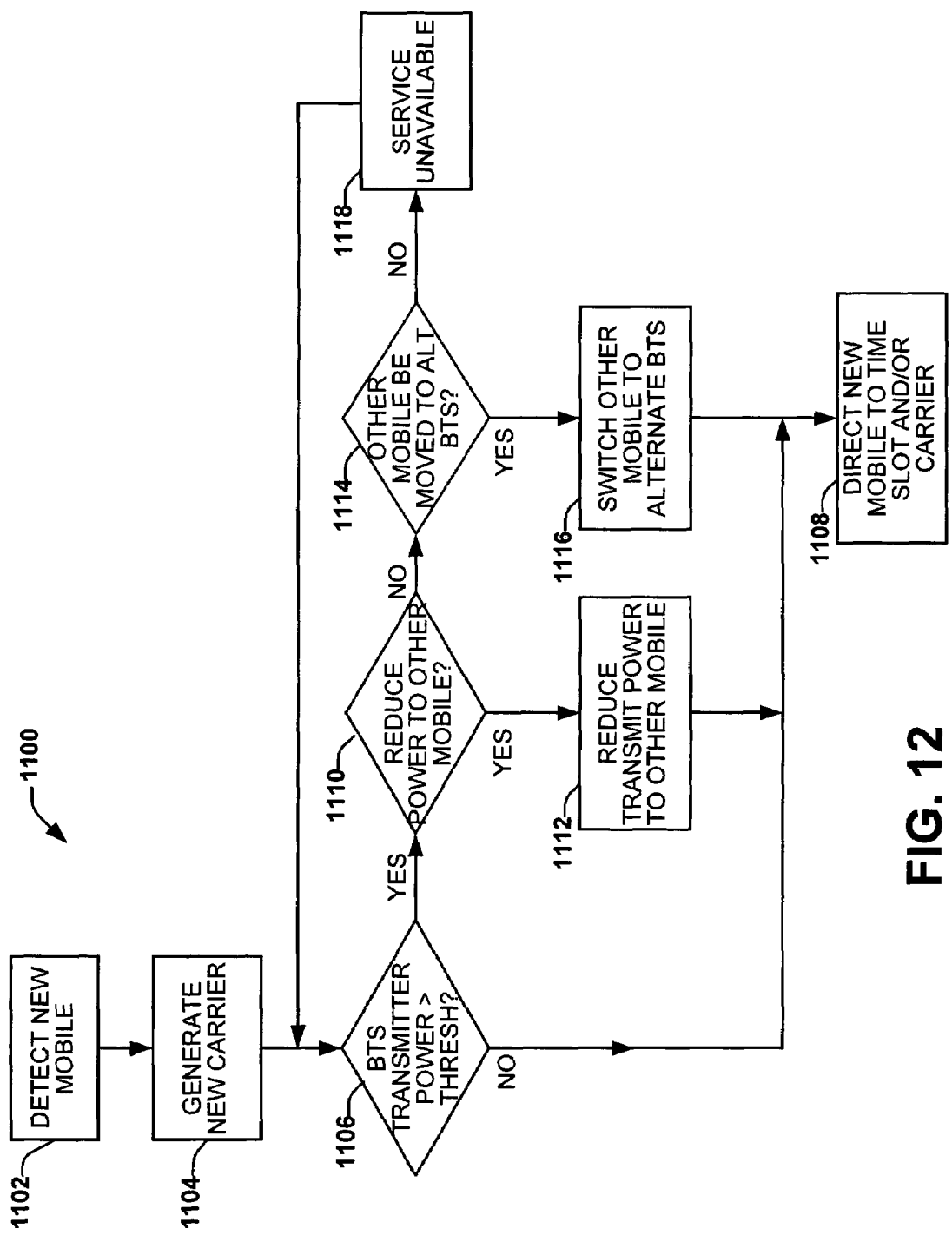
FIG. 12 is a flow diagram illustrating a method for adding a new user to a BTS in accordance with an aspect of the present invention.

FIG. 12 is a flow diagram illustrating a method 1100 for adding a new user to a BTS in accordance with an aspect of the present invention. At 1102, the BTS detects a new mobile unit attempting to be added to the BTS, such as by a powering up of the mobile unit or by a handoff directed by the BSC. The BTS generates a new carrier to communicate with the new mobile, as shown at 1104. The new carrier may be at the new mobile unit's current operating frequency or at a predetermined contingent frequency.

At 1106, the BTS determines if its transmitter power is greater than a predetermined threshold power level. The power threshold level, for example, can correspond to full power or some other predetermined power level. If the transmitter does not exceed the power threshold, then, at 1108, the BTS directs the new mobile unit to a new time slot and/or a new carrier.

However, if it is determined at 1106 that the transmitter power exceeds the threshold power level, the BTS determines if it can reduce its transmit power to another mobile unit (e.g. not transmitting during another mobile unit's time slot), while the new mobile is added, as shown at 1110. The BTS, for example, can work with the BSC to determine if it can temporarily reduce its transmit power to another mobile unit power. If the BTS can reduce its transmit power to another mobile unit, at 1112, the BTS temporarily reduces its transmit power to the other mobile unit. The BTS then directs the new mobile unit to a new time slot and/or carrier at 1108.

If at 1110, another mobile unit cannot reduce its power, the method proceeds to 1114. At 1114, the BTS working with the BSC determines if another mobile unit can be moved to an alternate BTS. If another mobile unit can be switched, the mobile unit is directed to switch to an alternate BTS at 1116, either temporarily or permanently. The BTS then directs the new mobile unit to a corresponding time slot and/or a carrier used by the BTS, as shown at 1108.

If the BTS cannot reduce its transmit power to another mobile unit or another mobile unit can not be moved to another BTS, then at 1118 service may be dropped until either the BTS transmitter power drops below the power threshold or another mobile unit can reduce power, or another mobile unit can be moved to another BTS. Thus, from 1118 the methodology can return to 1106 in which corresponding actions can be repeated. Alternatively, it may be acceptable to increase the overall transmitter power temporarily.

Figure 13:
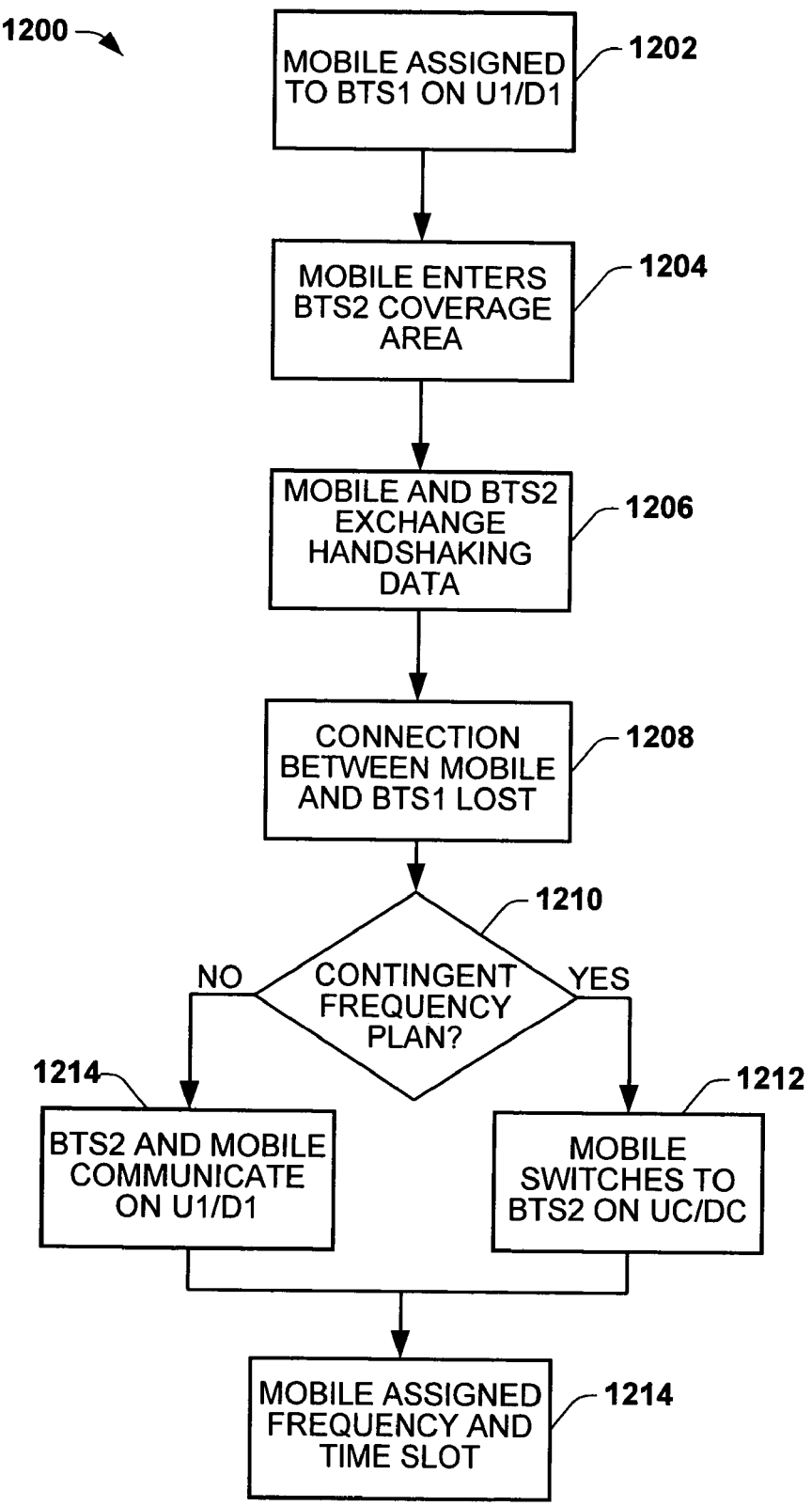
FIG. 13 is a flow diagram illustrating a soft handover methodology used when a mobile loses a connection to its assigned BTS.

FIG. 13 is a flow diagram illustrating a method 1200 employing soft handover for handling a lost connection between a mobile unit and a BTS. At 1202, the mobile unit is connected to a first BTS (BTS1) on uplink frequency U1 and downlink frequency D1. While still communicating with the BTS1 as its primary connection, the mobile unit enters the coverage area of a second BTS (BTS2). At 1206, the mobile and BTS2 exchange handshaking data, enabling soft handover to occur. The handshaking data may comprise a contingent frequency plan. The contingent frequency plan contains a frequency, and can also contain a time slot for the mobile to switch to in the event it loses contact with its assigned BTS, which is BTS1 in this example. The exchange may be initiated either by the mobile unit or BTS2. The mobile is still assigned to BTS1, but is also in communication with BTS2 and is prepared for handover. At 1208, the connection between the mobile unit and BTS1 is lost.

At 1210, a determination is made as whether a contingent frequency plan was established. If there is a contingent frequency plan (YES), at 1212 communication occurs between the mobile unit and BTS2 utilizing the contingent frequencies, uplink frequency UC and downlink frequency DC. The mobile unit can switch to the contingent frequencies, or if necessary, dynamically add them (e.g., as shown in FIG. 2). If at 1210 it is determined that no frequency plan was established (NO), then communication between BTS2 and the mobile unit are on U1/D1. BTS2 can add the carrier for D1 if necessary. AT 1214, BTS2 sends frequency and time slot data, or any other necessary parameters, to the mobile unit. Handover of the mobile unit from BTS1 and BTS2 is complete.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system, comprising
    a first base transceiver (BTS) unit that receives on a first primary uplink frequency and is configured to add at least one secondary uplink frequency, and the first BTS transmits on a first primary downlink frequency and is configured to add at least one secondary downlink frequency;
    a second BTS that receives on a second primary uplink frequency and is configured to add at least one secondary uplink frequency, and the second BTS transmits on a second primary downlink frequency and is configured to add at least one secondary downlink frequency; and
    a controller associated with the first BTS and the second BTS, the controller controls to which of at least the first and second BTS's a mobile unit should be connected based on a signal received by the first and second BTS's from the mobile unit, the controller causes one of the first and second BTS's to add a new carrier to communicate with the mobile unit based on the controller determining that the mobile unit should switch to the one of the first and second BTS's.

2. The system of claim 1, wherein the controller causes the one of the first and second BTS's to transmit a message to the mobile unit to enable the mobile unit to switch to at least one of a new uplink frequency and a new downlink frequency for communication with the one of the first and second BTS's.

3. The system of claim 1, wherein at least one of the first and second BTS's provides information to the controller based on the signal received from the mobile unit by the at least one of the first and second BTS's, the controller controlling to which of at least the first and second BTS's the mobile unit should be connected based on the information provided by the first and second BTS's.

4. The system of claim 3, wherein the information provided by the first and second BTS's include at least a substantial portion of the signal received from the mobile unit, the controller combines the at least a substantial portion of the signal provided by the first and second BTS's to ascertain to which of at least the first and second BTS's the mobile unit should be connected.

5. The system of claim 3, wherein the controller employs the information provided by the first and second BTS's to determine characteristics associated with at least one of a propagation environment and signal interference for the mobile unit, the controller controlling to which of the first and second BTS's the mobile unit should be connected based on the at least one of a propagation environment and signal interference for the mobile unit.

6. The system of claim 3, the controller further comprising a combining unit for combining the signal received from the first BTS with the second BTS for improved reception of the signal from the mobile unit.

7. The system of claim 6, wherein the new carrier is deleted by the BTS after the mobile unit has completed switching to the one of the first and second BTS.

8. The system of claim 1, wherein the new carrier for the second BTS is on the first BTS's primary downlink frequency.

9. The system of claim 1 wherein the new carrier is on a predetermined contingent frequency.

10. The system of claim 1, the controller further comprising a memory containing carrier allocation data, the carrier allocation data comprising carrier data for the first BTS, the second BTS, and the mobile unit.

11. The system of claim 10, the carrier data comprising the first primary uplink frequency and the second primary uplink frequency.

12. The system of claim 10, the carrier allocation data comprising a contingent frequency plan with a contingent frequency for each mobile unit to switch to when the mobile unit is unable to adequately communicate with the at least one of the first and second BTS's to which the mobile unit is connected.

13. The system of claim 12, wherein the contingent frequency plan is updated at a predetermined interval.

14. The system of claim 13 wherein the predetermined interval is every burst.

15. The system of claim 12 wherein the contingent frequency plan rotates the contingent frequency for each mobile unit among a pre-selected plurality of frequencies provided by the contingent frequency plan.

16. A system, comprising:
    a plurality of base transceivers (BTSs), each BTS receives a primary uplink frequency and a transmits at a primary downlink frequency for communicating as a primary BTS with assigned mobile units, and each BTS unit being configured as a secondary BTS to monitor at least one additional frequency associated with an unassigned mobile unit; and
    a controller that receives information from the plurality of BTSs based on signals each BTS receives from respective assigned mobile units and at least one unassigned mobile unit, the controller providing a contingency plan that informs a given mobile unit of at least one selected secondary BTS to communicate with in the event the mobile unit loses contact with the primary BTS, the contingency plan comprising communication parameters to facilitate communication between the given mobile unit and the at least one selected secondary BTS, the mobile unit employing at least a portion of the contingency plan to perform a soft handover from the primary BTS to a respective one the at least one selected secondary BTS.

17. The system of claim 16, the controller further comprising a combining unit for combining the data sent by each BTS to improve reception of the signal from the mobile units in the system.

18. The system of claim 16, the at least one additional frequency comprises the primary uplink frequency for at least an adjacent one of the plurality of BTS's.

19. A system, comprising
    a plurality of base transceivers (BTS's), each BTS receives a primary uplink frequency and a transmits at a primary downlink frequency for communicating as a primary BTS with assigned mobile units, and each BTS unit being configured as a secondary BTS to monitor at least one additional frequency associated with an unassigned mobile unit;
    a controller that receives information from the plurality of BTS's based on signals each BTS receives from respective assigned mobile units and at least one unassigned mobile unit, the controller providing a contingency plan that informs a given mobile unit of at least one selected secondary BTS to communicate with in the event the mobile unit loses contact with the primary BTS; and
    the controller commanding one of a primary BTS and a secondary BTS to send soft handover data to a given mobile for controlling to which of at least the first and second BTS's the mobile unit should be connected based on the information received from the plurality of BTS's.

20. A system, comprising
a plurality of base transceivers (BTS's), each BTS receives a primary uplink frequency and a transmits at a primary downlink frequency for communicating as a primary BTS with assigned mobile units, and each BTS unit being configured as a secondary BTS to monitor at least one additional frequency associated with an unassigned mobile unit; and
a controller that receives information from the plurality of BTS's based on signals each BTS receives from respective assigned mobile units and at least one unassigned mobile unit, the controller employs the information received from the plurality of BTS's to determine characteristics associated with at least one of a propagation environment and signal interference for the mobile unit, the controller controlling to which of the first and second BTS's the mobile unit should be connected based on the at least one of a propagation environment and signal interference for the mobile unit.

21. The system of claim 20, the information further comprising at least one of received signal strengths, signal interference, error rate, direction of travel, carrier to noise ratio and load balancing.

22. The system of claim 20, the controller commanding one of the secondary BTS's to become a new primary BTS for the mobile unit and to notify the mobile unit to switch to the new BTS.

23. A system, comprising
a plurality of base transceivers (BTS's), each BTS receives a primary uplink frequency and a transmits at a primary downlink frequency for communicating as a primary BTS with assigned mobile units, and each BTS unit being configured as a secondary BTS to monitor at least one additional frequency associated with an unassigned mobile unit;
a controller that receives information from the plurality of BTS's based on signals each BTS receives from respective assigned mobile units and at least one unassigned mobile unit, the controller providing a contingency plan that informs a given mobile unit of at least one selected secondary BTS to communicate with in the event the mobile unit loses contact with the primary BTS; and
the controller providing the contingency plan to each of the plurality of BTS's for instructing at least the assigned mobile units to enable handover to the selected secondary BTS identified by the contingency plan.

24. The system of claim 23, the contingency plan further comprises a contingent frequency associated with the selected secondary BTS for the mobile unit to switch to in the event the mobile unit loses contact with the primary BTS.

25. The system of claim 23, the controller updating the contingency plan at a predetermined interval.

26. The system of claim 23, the controller instructing the selected secondary BTS to add a carrier to contact a selected one of the assigned mobile units on one of a frequency for the primary BTS and a contingent frequency provided in the contingency plan.

27. The system of claim 23, wherein the selected secondary BTS communicates with the selected one of the assigned mobile units during an unused time slot for the selected one of the assigned mobile units.

28. A controller in a communications system, comprising:
means for providing a plan to a mobile unit, the plan comprising a contingent carrier for the mobile unit to switch to in the event of carrier loss;
means for assigning a contingent base transceiver station (BTS) to the mobile unit for communicating with the mobile unit on the contingent carrier;
the communications system further comprising:
means for determining that at least one of no signal and an inadequate signal was received from the mobile unit by a primary BTS associated with the mobile unit;
means for causing the primary BTS to stop transmitting during a time slot assigned to the mobile unit based on the determination;
means for causing the contingent BTS to add the contingent carrier at a first downlink frequency; and
means for causing the contingent BTS to send a signal on the carrier during the time slot assigned to the mobile unit.

29. The communications system of claim 28, further comprising means for removing the contingent carrier after establishing a connection between the contingent BTS and the mobile unit.

30. A method for implementing soft handover at a first base transceiver (BTS) unit, comprising: monitoring a connection between a mobile unit and a second BTS; adding a downlink carrier for the first BTS to communicate with the mobile unit; and sending a signal to the mobile unit to cause the mobile unit to switch from the connection with the second BTS and to connect with the first BTS via the downlink carrier; and determining that at least one of no signal and an inadequate signal was received from the mobile unit by the second BTS unit; and causing the second BTS to stop transmitting during a time slot assigned to the mobile unit based on the determination; and monitoring a predetermined contingency frequency by the first BTS, the predetermined contingency frequency being used by the mobile unit when the mobile unit cannot adequately communicate with the second BTS.

31. The method of claim 30, the signal comprises an uplink frequency for the mobile unit to communicate with the first BTS.

32. The method of claim 30 wherein the downlink carrier is sent on the predetermined contingency frequency.

33. The method of claim 32, further comprising removing the downlink carrier after establishing a connection between the first BTS and the mobile unit.

34. The method of claim 30, further comprising:
transmitting a plan to the mobile unit, the plan comprising a contingent carrier for the mobile unit to switch to in the event of carrier loss; and
assigning a contingent primary BTS unit to the mobile unit for communicating with the mobile unit on the contingent carrier.

35. The method of claim 34, further comprising updating the contingent carrier of the plan at a predetermined interval.

* * * * *